Nov. 30, 1926.
A. F. SCHNELL
1,609,209
FISHING APPARATUS
Filed March 30, 1926
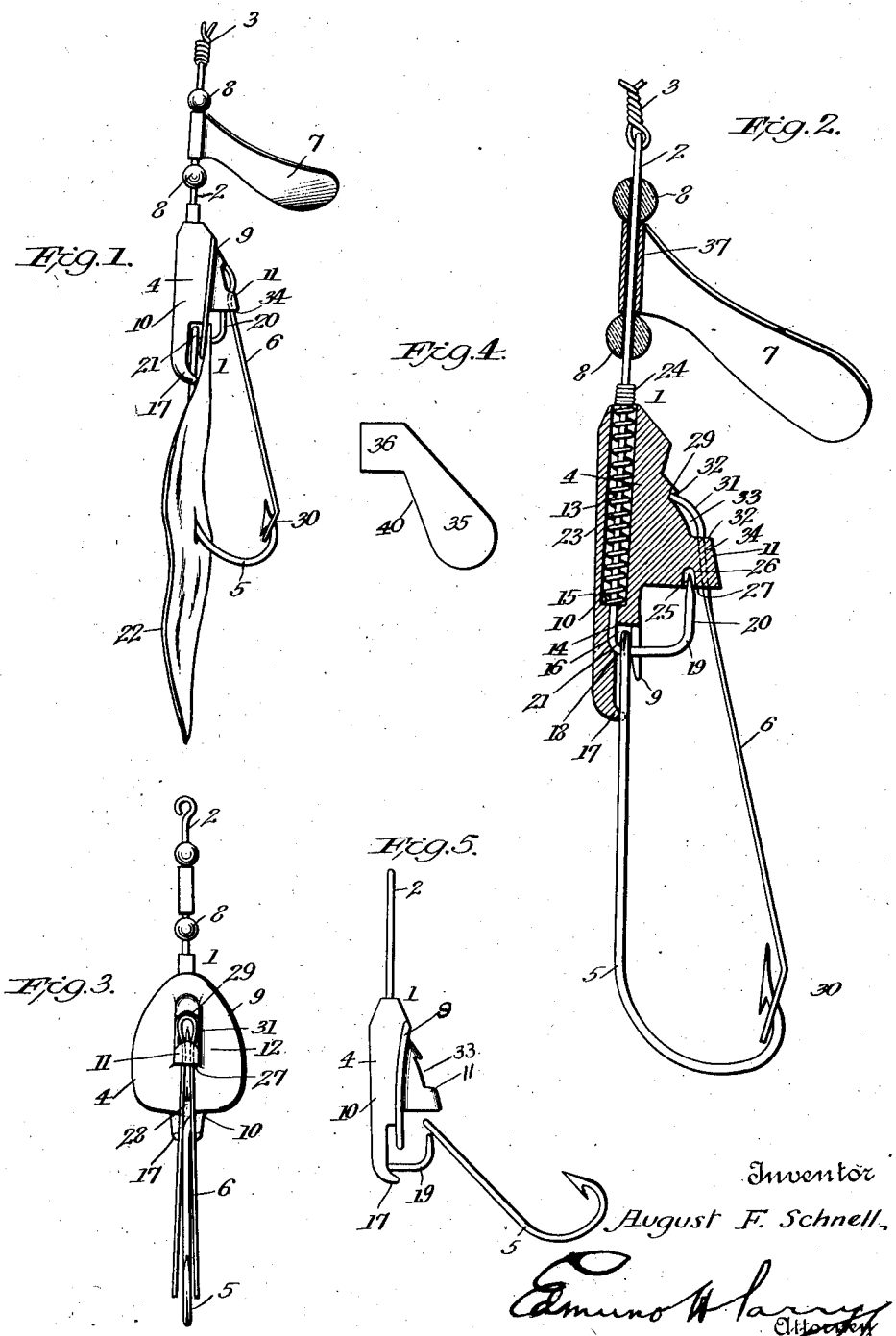
Inventor
August F. Schnell, Patented Nov. 30, 1926.

1,609,209

UNITED STATES PATENT OFFICE.

AUGUST F. SCHNELL, OF KANKAKEE, ILLINOIS.

FISHING APPARATUS.

Application filed March 30, 1926. Serial No. 98,484.

This invention relates generally to fishing apparatus and, in its more specific aspect, to an artificial bait or fish lure for use, for instance, in casting or trolling.

An object of the invention is the provision of a fish lure composed of a very few parts and extremely simple of construction, wherein the parts are so designed and arranged that friction between the parts and the medium in which the lure is used is reduced to a minimum and possibility of entanglement thereof with weeds or the like in use is practically eliminated.

Another object of the invention is the provision of a device of this character embodying means whereby the device is caused to maintain a definite, predetermined position with respect to the surface of the water when in use.

A further object of the invention is the provision of a combined sinker and lure guiding member having associated therewith means for normally retaining a hook and a weed guard in fixed positions relative thereto while permitting ready detachment of these elements therefrom when desired.

A further object of the invention is the provision of a fish lure wherein the shaft to which the line is attached and the sinker or body portion of the lure are so arranged that portions of the shaft serve yieldingly to retain the hook and bait in position.

A still further object of the invention is the provision of a spinner embodying novel features of construction which permit it to be made of unusually light-weight material and cause it to function with less liability of entanglement with weeds or the like in use.

With these and other objects in view, as will become apparent as the description proceeds, the invention consists of the novel features of construction of the separate elements, the combination of these elements, and the arrangement of parts hereinafter to be fully described and pointed out in the claims.

A full and complete understanding of the invention may be obtained by a consideration of the following detailed description taken in connection with the accompanying drawings forming a part of the disclosure, it being understood that while the drawings show a single practical embodiment of the invention, the latter is not to be confined to the showing thereof but may be changed or modified so long as such changes and modifications mark no material departure from the salient features of the invention as hereinafter described and claimed.

In these drawings:

Figure 1 is a view in side elevation of a fish lure embodying the features of my invention;

Figure 2 is an enlarged view in longitudinal central section of the device shown in Fig. 1 with the pork rind removed;

Fig. 3 is a view in top plan thereof;

Figure 4 is a view in plan of a blank from which the spinner is formed; and

Figure 5 illustrates the relative position of the elements when a hook is being attached.

In the particular embodiment of the invention shown in the accompanying drawing, the reference-character 1 designates my improved fish lure in its entirety. Preferably and as shown, the lure comprises a shaft 2 adapted to be made fast in the usual manner to a fish line 3; a sinker or body 4 movably mounted on the shaft 2; a fish hook 5 removably associated with the shaft and sinker; a weed guard 6 removably associated with the sinker in protecting relation to the hook; and a single-winged spinner 7 rotatably mounted upon shaft 2 between a pair of apertured beads 8 disposed thereon intermediate the sinker 4 and line 3.

The body or sinker 4, which is preferably cast of suitable metal and exteriorly plated or polished, comprises a central wing or guiding portion 9, an elongated keel 10 depending centrally from the wing, and a substantially triangular-shaped raised section 11 projecting centrally from the upper surface 12 of the wing. As shown, the keel 10 is drilled from its forward end to provide a cylindrical spring housing chamber 13 and a small hole 14 extends centrally from the bottom 15 of the chamber into a slot 16 provided in the keel 10 directly beneath the wing 9. The keel 10 projects rearwardly past the wing 9 and is upturned and bifurcated at the end, as at 17, to receive the shank of hook 5. The shaft 2 extends through the chamber 13 and hole 14 and is bent first upwardly, as at 18, and then forwardly, as at 19, to provide a hook 20 for engagement with the eye 21 of hook 5 and with the pork rind, minnow, or other suitable bait 22. An expansion spring 23, mounted upon the shaft 2 and fast at one of its ends 24 thereto, bears at its opposite end against the bottom 15 and serves to yieldingly retain the forward pointed end 25 of hook 20 within a recess 26 provided in the rear wall 27 of the raised section 11, the rear end of wing 9 being slotted as at 28 to accommodate the hook 20. This construction prevents accidental removal of the bait or hook from the sinker.

The weed guard 6 preferably comprises a single spring wire bent centrally upon itself into hairpin form, as at 29, then angularly bent adjacent the free ends to provide hook-engaging portions 30, and curved adjacent the bent portion 29 to provide a bowed or spring portion 31 which, when disposed between the substantially vertical walls 32 of a cut-out 33 in the section 11, serves to removably retain the weed guard in operative position. As shown, the legs of the weed guard extend through a pair of spaced holes 34 drilled through the section 11 and extending from the wall 27 into the cut-out or recess 33. By this construction it is apparent that the weed guard may be quickly associated with the sinker by inserting its ends through the holes 34 and pushing it rearwardly until the spring portion 31 slips into recess 33, and may be as easily removed by raising the spring portion—as, for instance, by insertion of the thumb-nail thereunder—and pulling the guard forwardly away from the sinker.

The spinner 7 is preferably formed of a blank 40 of thin metal (shown in Fig. 4) which comprises a wing portion 35 and a bearing-forming portion 36. The bearing-forming portion is rolled upon itself to form an elongated cylindrical bearing 37 of the proper internal diameter to permit easy rotation of the spinner when mounted upon the shaft 2, and the wing portion is spirally curved to render it practically frictionless whereby wear on the line, reel and guides therefrom is rendered negligible. The employment of a solid elongated bearing makes it possible to construct the spinner of very light material and reduces the possibility of entanglement of weeds or the like in the bearing, which possibility is further decreased by the beads 8 which normally fit tightly against the ends of the bearing. The spinner, being of light material, has less weight and therefore lifts more easily in its propelling action than would otherwise be possible.

From the foregoing, it will be observed that the expansion spring 23, which is wholly contained within the keel 10, automatically retains the shaft 2 in such position that the hook 5 and bait 22 are positively held in proper position while permitting ready removal thereof when desired. To remove the hook 5 or bait 22 from the sinker, it is only necessary to place the first and second fingers of one hand against the rear edge of the wing 12 on opposite sides of the keel 10 and the thumb of the same hand against the eye of shaft 2, and then applying pressure causes the body or sinker to move along the shaft, whereupon the fish hook or bait may be removed from or associated with the body with the free hand and without the use of any instrument. It it to be observed that in this device, in contradistinction to known devices, the hook is attached to the shaft which, in turn, is fastened directly to the line. The peculiar shape of the sinker or body causes the lure to take a predetermined position in use, that is, with the surface 12 of the wing up and the guiding keel disposed beneath the wing, and the elements are all so shaped and arranged as to reduce the liability of entanglement of the lure with weeds or the like to a minimum.

What I claim is:

1. A fish lure comprising a shaft, a sinker movably mounted thereon, and cooperating means on the shaft and sinker for removably retaining a fish hook in fixed relation to the sinker.

2. A fish lure comprising a shaft, a sinker movably mounted thereon, and cooperating means on the shaft and sinker for removably retaining a fish hook in fixed relation to the sinker, and means on the sinker for detachably retaining a weed guard in operative position with respect to the hook.

3. A fish lure including a shaft bent at one end to provide a hook, a sinker movably mounted on the shaft, means on the sinker for limiting movement thereof on the shaft in one direction, and additional means carried by the shaft and disposed within the sinker for yielding opposing movement of the sinker on the shaft in the other direction.

4. A fish lure including a shaft, a sinker longitudinally movable on the shaft and formed with a slot to receive the eye of a fish hook, and an angular extension on the shaft extending into the slot for engagement within said eye.

5. A fish lure comprising a sinker including a flat wing and a depending keel; said keel being transversely slotted adjacent the wing and extending past an edge thereof; a fish hook having its eye disposed within the slot; and a shaft passing through the keel and having an angular extension passing through the eye and traversing the slot.

6. A fish lure comprising a sinker including a flat wing and a depending keel; said keel being transversely slotted adjacent the wing and extending past an edge thereof; a fish hook having its eye disposed within the slot; a shaft passing through the keel and having an angular extension passing through the eye and traversing the slot; and means on the shaft for yieldingly retaining the angular extension within the slot.

7. A fish lure comprising a sinker including a flat wing, a depending keel extending past one edge of the wing, and an extension upstanding centrally from the wing and having a recess therein; said sinker being transversely slotted and the end of the extending portion of the keel being upturned and grooved; a fish hook having its eye disposed within the slot and its shank disposed within the groove; said wing having a slot extending inwardly from one edge and communicating with the transverse slot; a shaft longitudinally movable within the keel; a bent portion of the shaft passing through said eye and slots and engageable in said recess; and spring means on the shaft for yieldingly retaining it in position with its end in said recess.

8. A fish lure comprising a sinker including a flat wing, a depending keel extending past one edge of the wing, and an extension upstanding centrally from the wing and having a recess therein; said sinker being transversely slotted and the end of the extending portion of the keel being upturned and grooved; a fish hook having its eye disposed within the slot and its shank disposed within the groove; said wing having a slot extending inwardly from one edge and communicating with the transverse slot; a shaft longitudinally movable within the keel; a bent portion of the shaft passing through said eye and slots and engageable in said recess; spring means on the shaft for yieldingly retaining it in position with its end in said recess; and means on the upstanding extension for removably retaining a weed guard in operative position with respect to the hook.

9. A fish lure comprising a sinker including a flat wing, a depending keel extending past one edge of the wing, and an extension upstanding centrally from the wing and having a recess therein; said sinker being transversely slotted and the end of the extending portion of the keel being upturned and grooved; a fish hook having its eye disposed within the slot and its shank disposed within the groove; said wing having a slot extending inwardly from one edge and communicating with the transverse slot; a shaft longitudinally movable within the keel; a bent portion of the shaft passing through said eye and slots and engageable in said recess; spring means on the shaft for yieldingly retaining it in position with its end in said recess; and a spinner rotatably mounted on the shaft adjacent to the sinker.

10. A fish lure comprising a shaft including a pair of parallel sections of unequal length and a connecting section, a sinker longitudinally movable on the longer section and having a recess for receiving an end of the shorter section, a fish hook having its eye disposed on the connecting section, means on the sinker for retaining the shank of the fish hook in longitudinal alinement with the sinker, and means on the shaft and disposed within the sinker whereby the shaft is yieldingly maintained at the limit of its movement in one direction with its end disposed within the recess.

11. In a fish lure, a shaft, a sinker longitudinally movable on the shaft and so formed as to position itself in a predetermined manner in use, and coacting means on the shaft and sinker whereby a hook and bait may be yieldingly locked in fixed relation with respect to the sinker.

In testimony whereof I affix my signature.

AUGUST F. SCHNELL